Figure 1:
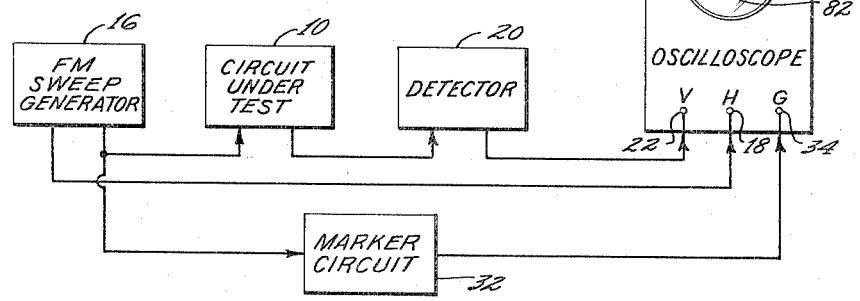

Sept. 18, 1956  D. L. LUNDGREN  2,763,835
FREQUENCY MARKER SYSTEM
Filed Aug. 28, 1952

INVENTOR.
Don L. Lundgren
BY
ATTORNEY

United States Patent Office 2,763,835
Patented Sept. 18, 1956

2,763,835

FREQUENCY MARKER SYSTEM

Don L. Lundgren, West Collingswood, N. J., assignor to Radio Corporation of America, a corporation of Delaware Application August 28, 1952, Serial No. 306,777

2 Claims. (Cl. 324—57)

This invention relates to frequency marker systems generally, and more particularly to a method of and means for marking a frequency response curve of a circuit under test. While not specifically limited thereto, the method and means of the present invention are particularly applicable to the alignment of the intermediate-frequency (I.-F.) circuits of frequency modulation (FM) receivers of extremely high sensitivity.

A common method of aligning an I.-F. circuit of an FM receiver is to connect a signal generator to the grid of one I.-F. stage and an output meter to the grid of the next stage. A loading resistor is placed across the I.-F. secondary. The signal generator is set to the center frequency of the I.-F. strip and the primary of the I.-F. transformer is adjusted for peak meter reading. Next, the loading resistor is placed across the primary of the I.-F. transformer and the secondary is tuned for peak meter reading. The frequency response curve of the I.-F. strip may be tested for symmetry by raising and lowering the frequency of the signal generator by an equal amount on either side of the center frequency. If the I.-F. transformer is properly adjusted, the output meter reading will be the same for both the low and high frequencies about the center frequency.

It is apparent, however, that this alignment procedure is time consuming and tedious, especially where there are as many as 14 I.-F. transformers in a single FM receiver. Furthermore, it requires a well trained and experienced test man to do the aligning. The alignment procedure of an I.-F. transformer using an oscilloscope simplifies and speeds up the alignment procedure considerably. Any visual alignment equipment, however, must be fool-proof to the extent that unskilled personnel may operate it with a minimum of technical knowledge. It has been proposed to mark a frequency response curve by means of the heterodyning principle but the width of the frequency marker on the response curve is objectionable because the marker is too wide and indeterminate. Frequency markers must be very stable and accurate in order to mark highly selective response curves.

It is, therefore, an important object of the present invention to provide an improved frequency marker system for marking frequency response curves with definite, known frequencies.

It is another object of this invention to provide an improved frequency marker system for marking a visual frequency response curve with a narrow gap representative of a known frequency.

Still another object of this invention is to provide an improved method of and means for marking a visual frequency response curve with a plurality of frequency markers representative of known frequencies, which are easy to use and highly efficient in operation.

According to the invention, these and other objects and advantages are attained in an improved frequency marker system by means of which a frequency response curve of a circuit under test is produced on the face of a cathode ray tube of an oscilloscope. Signals from an FM sweep generator are applied to the circuit under test. The output of the circuit under test is detected and applied to the vertical deflection circuit of the oscilloscope. Narrow gaps are interposed in the frequency response curve of the circuit under test by means of a marker circuit connected between the FM sweep generator and the control grid circuit of the oscilloscope. The marker circuit includes a pulse former circuit of the "Q multiplier type" and comprises an electron tube and a tuned network. By the "Q" of a resonant network is meant the quality rating of the network equal to the inductive reactance divided by the resistance. The negative resistance presented to the tuned network by the tube increases the "Q" of the network to the point where extremely selective transmission is realized. As the FM sweep generator sweeps through the resonant frequency of the tuned network in the grid circuit of the tube, a sharp positive pulse is produced at the output of the tube. This sharp positive pulse is amplified, inverted, clipped, and then applied to the grid circuit of the cathode ray tube to cause a blank spot in the oscilloscope trace. A plurality of marker circuits, each responsive to a different frequency, may be used to produce a plurality of blank spots, or gaps, in the oscilloscope trace.

The invention also resides in the method having the features hereinafter described and claimed.

Figure 2:
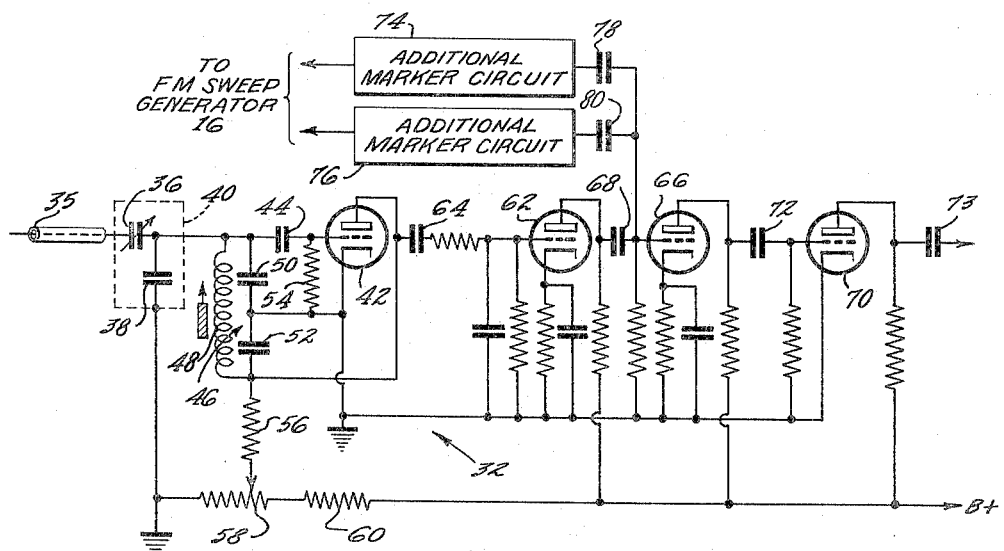

For a more detailed understanding of the invention, reference is made to the accompanying drawing, in which similar reference characters are applied to similar elements, and in which:

Fig. 1 is a block diagram of a frequency marker system used in conjunction with other pieces of test equipment, in accordance with the present invention; and Fig. 2 is a schematic diagram of an illustrative embodiment of the marker circuit, in accordance with the present invention.

Referring to Fig. 1, there is shown a circuit 10 under test for the purpose of deriving therefrom a frequency response curve. The circuit 10 may be any circuit, such as an I.-F. (intermediate-frequency) strip of an FM (frequency modulation) receiver or a filter circuit, for example, the frequency response curve of which is desired. To display the frequency response curve of the circuit 10 visually on the face 12 of the cathode ray tube of an oscilloscope 14, an FM sweep generator 16 is connected to the circuit 10. A sawtooth voltage which is derived from the FM sweep generator 16 is applied to the horizontal deflection circuit terminal 18 to provide a horizontal sweep voltage for the oscilloscope 14. The output of the circuit 10 is detected by a detector 20 of any suitable type. The output of the detector 20 is applied to the vertical deflection circuit terminal 22 of the oscilloscope 14. It will now be understood that a frequency response curve of the circuit 10, in response to the frequency sweep generator 16, will appear on the face 12 of the cathode ray tube of the oscilloscope 14. If the circuit 10 is an I.-F. strip of an FM receiver, and if the FM sweep generator sweeps through the resonant frequency of the circuit 10, the frequency response curve will have the appearance of the curve 24 on the face 12 of the cathode ray tube. The curve 24 will, however, be a continuous one without any gaps therein. In order to mark the frequency response curve 24 with gaps 26, 28 and 30, representative of known frequencies, the marker circuit 32 of this invention is connected between the FM sweep generator 16 and the control grid terminal 34 of the oscilloscope 14 or other usual means for modulating the cathode ray beam of the tube.

The marker circuit 32 is shown in detail in Fig. 2. The output from the FM sweep generator 16 that is applied to the circuit 10 is also applied, through a shielded cable 35, across a voltage divider comprising a variable capacitor 36 connected to ground through a capacitor 38. The capacitors 36, 38 are shielded by a shield 40, represented as a dashed rectangle. In order to obtain a very loose coupling between the FM sweep generator 16 and the marker circuit 32, the ratio of the capacitance of capacitor 38 to that of capacitor 36 may be in the order of about 1000:1. The voltage across the capacitor 38 is applied to the grid of an electron tube 42 through a coupling capacitor 44. Connected between the anode of the tube 42 and the junction between the capacitors 36, 38 is a resonant network 46 comprising a variable inductance 48 in parallel with capacitors 50 and 52. The junction between the capacitors 50, 52 is connected directly to the cathode of tube 42, and through a resistor 54 to the grid of the tube 42. A source of relatively high positive or B+ voltage (not shown) is applied to the anode of the tube 42 through a resistor 56 connected to a variable tap on a potentiometer 58 and through a resistor 60. One end of the potentiometer 58 is grounded, and the cathode of the tube 42 is also grounded.

The tube 42 and the resonant network 46 form a pulse former circuit of the "Q multiplier" type. The negative resistance presented to the resonant network 46 by the tube 42 increases the "Q" of the network to the point where extremely selective transmission may be realized. This high selectivity is determined by the adjustment of the variable tap on the potentiometer 58. The voltage applied to the anode of the tube 42 is of a magnitude just below that necessary to cause the tube 42 to oscillate. It will now be understood that as the FM sweep generator 16 sweeps through the resonant frequency of the resonant network 46, in the grid circuit of the tube 42, a sharp positive pulse is produced at the anode of the tube 42.

The sharp positive pulse produced at the anode of the tube 42 is applied to the grid of an amplifier tube 62, through a coupling capacitor 64. The amplifier tube 62 is in an amplifying circuit of conventional type and therefore no detailed explanation of its circuit is believed necessary. The amplified pulse at the anode of the amplifier tube 62 is now a negative going pulse. This negative going pulse is applied to the grid of an electron tube 66 through a coupling capacitor 68. The tube 66, and its associated conventional circuit, amplify and invert the pulse further. The purpose of the tube 66 and its associated circuit is to produce a positive going pulse at the anode thereof. The positive going pulse from the anode of the tube 66 is coupled to a grid of a tube 70, in a conventional clipper circuit, through a capacitor 72. The purpose of the clipper 70 is to produce a very narrow negative going pulse at the anode thereof. This narrow negative going pulse at the anode of the tube 70 is applied to the control grid circuit terminal 34, of the oscilloscope 14, through a coupling capacitor 73, for the purpose of driving the cathode ray tube of the oscilloscope 14 to cut-off and producing a blank spot, or gap, in a frequency response curve 24.

The operation of the marker circuit will be described, for illustrative purposes only and not in a limiting sense, in connection with the frequency marking of the frequency response curve 24 resulting from the circuit 10 under test, where the circuit 10 is an I.-F. strip having a resonant frequency of 915 kc. The FM sweep generator 16 is adjusted to produce a center frequency output signal of 915 kc. The sweep width of the FM sweep generator 16 may be variable up to +200 kc. and the sweep rate may be variable between 10 to 30 C. P. S. The resonant network 46 in the grid circuit of the tube 42 is also tuned by varying the inductance 48, as by slug-tuning, so that its resonant frequency is 915 kc. Each time the FM sweep generator 16 sweeps through the resonant frequency of the network 46 in the grid circuit of the tube 42, a sharp positive voltage pulse is produced at the plate of the tube 42. This pulse is amplified by the amplifier tube 62 and its associated circuit. The amplified pulse derived at the anode of the tube 62 is now negative going and is applied to the grid of the tube 66 where it is inverted at its anode into a positive going pulse. This positive going pulse is clipped, and inverted once more into a very sharp narrow negative going pulse which is applied to the grid control circuit terminal 34 of the oscilloscope 14 and will produce a gap 28 in the frequency response curve 24 on the face 12 of the cathode ray tube of the oscilloscope 14. This comes about by the momentary cutoff or blanking of the cathode ray beam in the cathode ray tube. The narrow gap 28 on the frequency response curve 24 is a frequency marker representative of 915 kc. If the circuit 10 under test is properly aligned to 915 kc. peak frequency, the frequency marker gap 28 on the curve 24 will be at the peak of the curve. If the frequency marker gap 28 is not at the peak of the frequency response curve 24, the circuit 10 under test may be adjusted, as by adjusting the I.-F. transformers, until the frequency marker gap 28 appears at the peak.

In order to test a frequency response curve of a symmetrical nature of symmetry, a plurality of frequency markers may be used on either side of a center frequency marker. To this end, there are provided additional marker circuits 74 and 76. The circuits 74 and 76 are the same in construction and operation as the marker circuit 32, except for the fact that they have resonant networks, similar to the resonant network 46 of the marker circuit 32, that are tuned to different frequencies. For instance, the marker circuit 74 may have its resonant network tuned to a frequency of 900 kc., and the marker circuit 76 may have its resonant network tuned to 930 kc. It will, therefore, be understood that as the FM sweep generator 16 sweeps through the resonant frequency 900 kc. the marker circuit 74 will produce a sharp amplified negative going pulse which may be coupled to the grid of the tube 66 through a capacitor 78. This negative going pulse is then inverted, clipped, inverted again, and applied to the grid control circuit, terminal 34, of the oscilloscope 14 to produce a blank spot, or gap 26, in the frequency response curve 24. The gap 26 is representative, therefore, of a frequency of 900 kc. on the frequency response curve. As the FM sweep generator 16 sweeps through a frequency of 930 kc., a negative going amplified pulse is produced by the marker circuit 76 and applied to the grid of the tube 66 through a capacitor 80. This latter pulse is inverted, clipped, inverted again, and applied as a sharp negative going pulse to the grid control circuit terminal 34 of the oscilloscope 14 to produce a gap 30 in the frequency response curve 24. The gap 30 is representative of the frequency 930 kc. If the frequency response curve 24 is symmetrical, the gaps 26 and 30 will be symmetrically disposed about the gap 28, and will be an equal distance above a base line 82 of the frequency response curve 24. If the frequency response curve 24 is not symmetrical, the circuit 10 under test may be easily aligned, using the frequency marker gaps 26, 28, 30 as guides, by adjusting the circuit 10.

Thus, there has been shown and described herein, in accordance with the objects of the invention, a method of and means for marking a frequency response curve with one or more narrow gaps each representative of a known frequency. A system has been described wherein an FM sweep generator was connected to the input of a circuit under test, and the output of the circuit was detected and displayed on an oscilloscope as the frequency response curve of the circuit. A marker circuit comprising a pulse former of the "Q multiplier" type was described wherein the negative resistance presented to a resonant network by an electron tube increased the "Q" of the network in order to provide highly selective transmission. As the FM sweep generator swept through the resonant frequency of the resonant network in the pulse former circuit a sharp pulse was derived which was applied to the grid of a cathode ray tube as an amplified and clipped negative going pulse, whereby the cathode ray tube was driven to cut-off momentarily to provide a blank spot, or gap, in the frequency response curve.

What is claimed is:

1. In a system wherein an FM sweep generator is connected to the input of a circuit under test and to an oscilloscope, and the output of said circuit is detected and displayed on the cathode ray tube of said oscilloscope as the frequency response curve of said circuit, a marker circuit comprising an electron tube having at least an anode, a grid, and a cathode, a resonant network comprising an inductance having one end connected to said anode, a first capacitor connected between said grid and the other end of said inductance, a second capacitor and a third capacitor connected in series with each other and across said inductance, the junction between said second and third capacitors being connected to said cathode, a resistor between said cathode and said grid, a potentiometer, means to apply a source of unidirectional voltage across said anode and said cathode through said potentiometer, means to connect said FM sweep generator to said other end of said inductance, and means to amplify, clip, and invert the output of said anode of said electron tube and to apply the resulting output momentarily as a cut-off bias to said cathode ray tube.

2. A system as defined in claim 1 wherein said means to connect said FM sweep generator to said other end of said inductance comprises means to attenuate signals from said FM sweep generator.

References Cited in the file of this patent

UNITED STATES PATENTS

| 2,243,234 | Von Duhn | May 27, 1941 |
| 2,600,973 | Comte | June 17, 1952 |
| 2,610,228 | Devine | Sept. 9, 1952 |
| 2,626,980 | Balde | Jan. 27, 1953 |
| 2,657,307 | Balde | Oct. 27, 1953 |